US007953834B1

(12) United States Patent
Shagam et al.

(10) Patent No.: US 7,953,834 B1
(45) Date of Patent: May 31, 2011

(54) SYSTEM AND METHOD FOR REDUCING BANDWIDTH CONSUMED BY LOOPING MESSAGE PACKETS IN LOCAL AREA NETWORK

(75) Inventors: Eli Shagam, Brookline, MA (US); Scott B. Gordon, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 3493 days.

(21) Appl. No.: 09/599,229

(22) Filed: Jun. 22, 2000

(51) Int. Cl.
*G06F 15/173* (2006.01)
(52) U.S. Cl. .................. 709/223; 370/389; 370/316
(58) Field of Classification Search .................. 370/316, 370/238, 389, 392, 375, 537, 310, 360; 709/217, 709/219, 224–227, 232, 238, 236; 710/29
See application file for complete search history.

(56) References Cited

U.S. PATENT DOCUMENTS

| | | | | | |
|---|---|---|---|---|---|
| 5,425,028 | A | * | 6/1995 | Britton et al. | 370/389 |
| 5,675,741 | A | * | 10/1997 | Aggarwal et al. | 709/242 |
| 5,727,002 | A | * | 3/1998 | Miller et al. | 714/748 |
| 5,822,319 | A | * | 10/1998 | Nagami et al. | 370/392 |
| 5,841,764 | A | * | 11/1998 | Roderique et al. | 370/310 |
| 5,926,101 | A | * | 7/1999 | Dasgupta | 340/825.02 |
| 6,104,713 | A | * | 8/2000 | Nagami et al. | 370/392 |
| 6,131,123 | A | * | 10/2000 | Hurst et al. | 709/238 |
| 6,192,404 | B1 | * | 2/2001 | Hurst et al. | 709/224 |
| 6,216,163 | B1 | * | 4/2001 | Bharali et al. | 709/227 |
| 6,292,473 | B1 | * | 9/2001 | Duske et al. | 370/316 |
| 6,292,838 | B1 | * | 9/2001 | Nelson | 709/236 |
| 6,430,179 | B1 | * | 8/2002 | Meyer | 370/360 |
| 6,502,135 | B1 | * | 12/2002 | Munger et al. | 709/225 |
| 6,532,490 | B1 | * | 3/2003 | Lewis et al. | 709/217 |

(Continued)

OTHER PUBLICATIONS

Yoon et al, A Wireless Local Loop System Based on Wideband CDMA Technology, IEEE 1999.*

(Continued)

*Primary Examiner* — Thong H Vu
(74) *Attorney, Agent, or Firm* — Krishnendu Gupta; Scott A. Ouellette

(57) ABSTRACT

A local area network includes a plurality of devices and a firewall for interfacing the LAN to a wide area network. In the LAN, each device generates a message packets for transmission over the network in which a time to live field contains an initial value that is preferably selected to be a function of the maximum path length for transfer of message packets within the local area network. Similarly, the firewall, when it receives message packets from the WAN for transmission to a device on the LAN provides in the time to live field an initial value that is preferably selected to be a function of the maximum path length for transfer of message packets within the local area network. When the firewall received a message packet from the LAN for transmission over the WAN, it provides a default initial value that is selected for use for message packets transmitted over the WAN in the time to live field, which typically will be significantly higher than the initial value that is used in the local area network. Since the initial time to live value used in the local area network is preferably selected to be a function of the maximum path length for transfer of message packets within the local area network, it can be much lower than the value that is typically used. This can reduce the bandwidth taken up by message packets that are in a loop in the local area network, which, in turn, can allow for increased bandwidth available for message packets that are being transferred through a portion of the loop but which are not themselves looping through the entire loop.

17 Claims, 4 Drawing Sheets

U.S. PATENT DOCUMENTS

| | | | | |
|---|---|---|---|---|
| 6,600,741 | B1* | 7/2003 | Chrin et al. | 370/375 |
| 6,609,114 | B1* | 8/2003 | Gressel et al. | 705/50 |
| 6,721,316 | B1* | 4/2004 | Epps et al. | 370/389 |
| 7,139,242 | B2* | 11/2006 | Bays | 370/238 |
| 7,212,495 | B2* | 5/2007 | Karri et al. | 370/238 |
| 7,415,018 | B2* | 8/2008 | Jones et al. | 370/392 |
| 7,466,703 | B1* | 12/2008 | Arunachalam et al. | 370/392 |
| 2002/0064190 | A1* | 5/2002 | Sikora et al. | 370/537 |

OTHER PUBLICATIONS

Combinatorial Design of Congestion-Free Networks—Bulent Yener Yoram (1997) ; www.bell-labs.com/user/yener/PAPERS/ton97V5N6.ps.*

Combinatorial Design of Multi-Ring Networks with Combined . . . —Wool, Yener (1999) ; dimacs.rutgers.edu/pub/dimacs/TechnicalReports/TechReports/1999/99-04.ps.gz.*

Nomad: traffic-based network monitoring framework for anomaly detection Talpade et al . IEEE International Symposium o , Jul. 6-8, 1999.*

Design and evaluation of router-supported and end-to-end multicast receiver-based scoping protocols Clay et al ; Eight International Conference on , Oct. 11-13, 1999.*

The Shadow Approach: An Orphan Detec- tion Protocol for Mobile .; elib.uni-stuttgart.de/opus/volltexte/ 1999/331/pdf/331.pdf.*

Multicast Address Dynamic Client Allocation Protocol (MADCAP); http://www.ietf.org/rfc/rfc2730.txt.*

Using TRACERT to Troubleshoot TCP/IP Problems Summary; www.nsbar.com/tcp.pdf.*

Management of Mobile Agents in Telecommunication Networks—Huber ; www.rennes.enst-bretagne.fr/~ader/oliver/Papers/Management_Mobile_agent_in_Telecom_Networks_Trans.ps.gz.*

* cited by examiner

SYSTEM AND METHOD FOR REDUCING BANDWIDTH CONSUMED BY LOOPING MESSAGE PACKETS IN LOCAL AREA NETWORK

FIELD OF THE INVENTION

The invention relates generally to the field of digital information communications, and more particularly to systems and methods for reducing the amount of bandwidth that may be taken up by looping message packets in a local area network.

BACKGROUND OF THE INVENTION

Digital networks have been developed to facilitate the transfer of information, including data and programs, among digital computer systems and other digital devices. A variety of types of networks have been developed and implemented, including so-called "wide-area networks" (WAN's) and "local area networks" (LAN's), which transfer information using diverse information transfer methodologies. Generally, LAN's are implemented over relatively small geographical areas, such as within an individual office facility or the like, for transferring information within a particular office, company or similar type of organization. On the other hand, WAN's are generally implemented over relatively large geographical areas, and may be used to transfer information between LAN's as well as between devices that are not connected to LAN's. WAN's also include public networks, such as the Internet, which can carry information for a number of companies.

Generally, in both LANs and WANs route information is transferred among devices connected in networks in the form of message packets, employing routers, bridges, gateways and other switching devices (generally, routers) to transfer the message packets thereamong. The routers are interconnected in a mesh pattern. A LAN that is connected to a WAN typically includes a firewall to mediate communications between the LAN and the WAN. Since the routers in a LAN, as well as a WAN, are connected in a mesh pattern, errors can arise in which message packets are transferred in loops. As more and more message packets are caught up in a loop, the network bandwidth devoted to such message packets increases, decreasing the bandwidth available for other message packets at least in that region of the network.

To address this problem, message packets are typically provided with "time to live" information, which allows a message packet to be discarded if it remains in the network for too long a time. Typically, both LANs and WANs make use of message packet transfer protocols conforming to, for example, the well-known Internet protocol ("IP"), which specifies a relatively long time to live. While this does not cause a significant problem in WANs such as the Internet, it can allow message packets caught in a loop in a LAN to live for a long enough period of time that they can seriously degrade network performance.

SUMMARY OF THE INVENTION

The invention provides a new and improved system and method for reducing the amount of bandwidth that may be taken up by looping message packets in a local area network In brief summary, the invention in one aspect provides a device for connection to a communication link in a local area network. The device includes a message packet generator for generating a message packet for transmission over the network. In generating the message packet, the message packet generator provides a time to live field that contains an initial value that is preferably selected to be a function of the maximum path length for transfer of message packets within the local area network.

In another aspect, the invention provides a firewall for connection between a local area network and an external network. The firewall receives message packets from the external network for transmission to a destination device connected to the local area network, each message packet including a time to live field. The firewall, prior to transmitting the message packet over the local area network, substitutes for the value in the time to live field a value that is preferably selected to be a function of the maximum path length for transfer of message packets within the local area network. For message packets that the firewall receives from the local area network for transmission over the external network, the firewall substitutes a default initial value that is selected for use for message packets transmitted over the external network in the time to live field, which typically will be significantly higher than the initial value that is used in the local area network.

Since the initial time to live value used in the local area network is preferably selected to be a function of the maximum path length for transfer of message packets within the local area network, it can be much lower than the value that is typically used. This can reduce the bandwidth taken up by message packets that are in a loop in the local area network, which, in turn, can allow for increased bandwidth available for message packets that are being transferred through a portion of the loop but which are not themselves looping through the entire loop.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
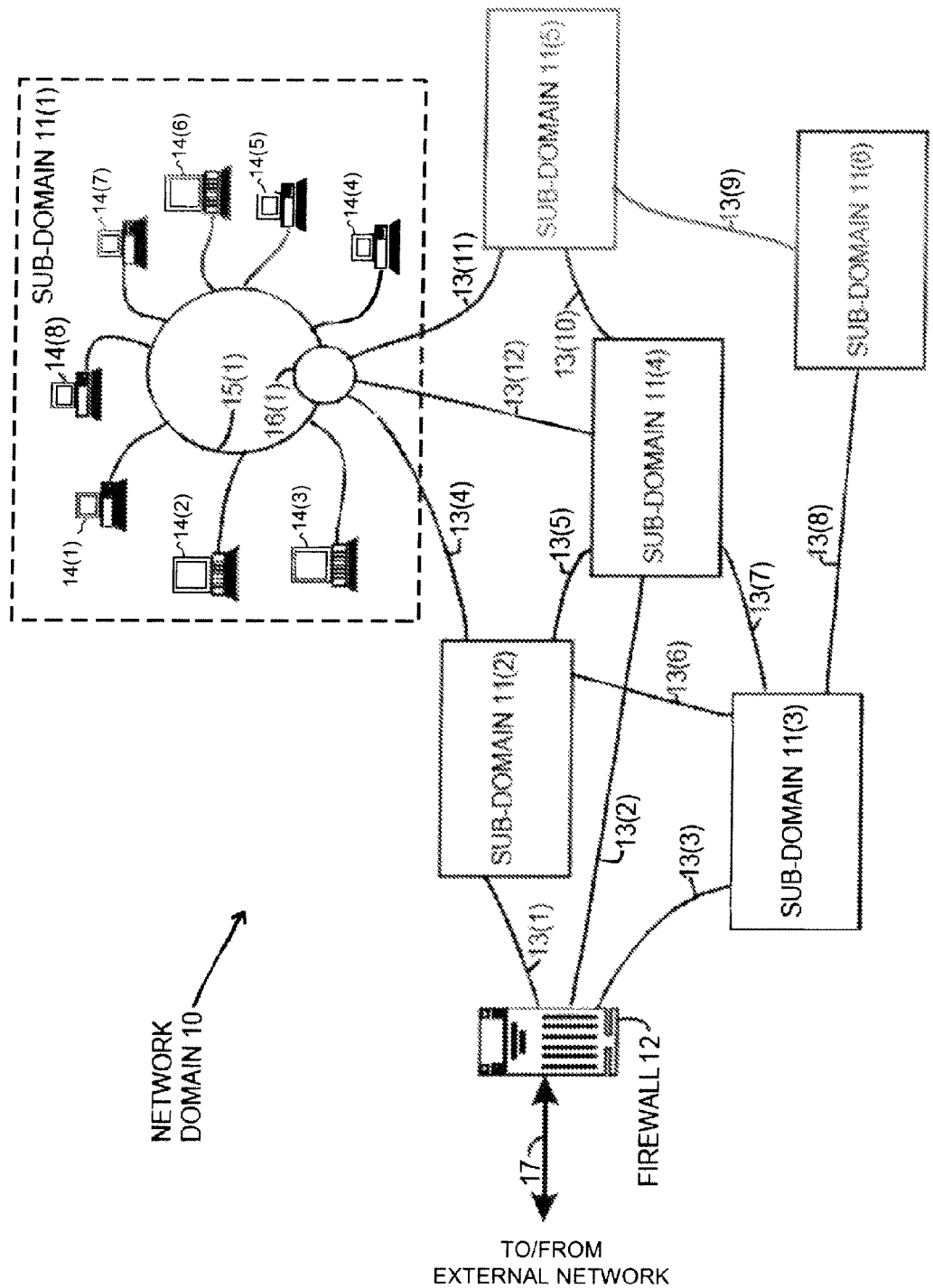
FIG. 1 is a functional block diagram of a network domain constructed in accordance with the invention.

FIG. 1 is a functional block diagram of a network domain 10 constructed in accordance with the invention. With reference to FIG. 1, network domain 10 includes a plurality of sub-domains 11(1) through 11(6) (generally identified by reference numeral 11(n)) and at least one firewall 12 interconnected by a plurality of communication links generally identified by reference numeral 13(p). Generally, the firewall 12 operates to regulate communications between the network domain 12, which may be a local area network maintained by a private organization, and devices (not shown) external to the network domain 10 that may wish to communicate with devices in the network domain 10 over, for example, a public network such as the Internet, the public switched telephony network (PSTN) and the like, as will be described below.

As noted above, network domain 10 includes a plurality of sub-domains 11(n). Each sub-domain 11(n), in turn, comprises one or more devices generally identified by reference numeral 14(d) and at least one router 16(n) interconnected by a sub-domain communication link 15(n). Generally, the devices 14(d) transfer information in the form of message packets over the sub-domain communication link 15. For message packets that are to be transferred from a device 14(d) in one sub-domain 11(n) to a device 14(d') in another sub-domain 11(n') (n' n), those message packets will be received by the router 16(n) of sub-domain 11(n) and transferred to a router 16(n') that is associated with another sub-domain 11($n_1$). The sub-domain 11($n_1$) may or may not be the sub-domain 11(n') that contains the destination device 14(d'). If the sub-domain 11($n_1$) is the sub-domain 11(n') that contains the destination device 14(d'), the router 16(n') that receives the message packet will transmit the message packet over the communication link 15(n') associated with that sub-domain 11(n'), thereby to facilitate reception thereof by the destination device 14(n').

On the other hand, if the sub-domain 11($n_1$) is not the sub-domain 11(n') that contains the destination device 14(n'), the router 16($n_1$) of that sub-domain 11($n_1$) that receives the message packet, will forward the message packet to a router 16($n_2$) of another sub-domain 11($n_2$). These operations will be repeated by routers 16($n_1$), 16($n_2$) . . . of successive sub-domains 11($n_1$), 11($n_2$) . . . until the message packet is received by the router 16(n') of the sub-domain 11(n') that contains the destination device 14(d'). When the router 16(n') receives the message packet, it will transmit the message packet over the communication link 15(n') to facilitate reception by the destination device 14(n'). The successive routers 16($n_1$), 16($n_2$) . . . define a path from the sub-domain 11(n) that contains the device 14(d) that is the source of the message packet, and the sub-domain 11(n') that contains the device 14(d) that is the destination.

As yet another possibility, a device 14(d) may wish to send a message packet to an external device (not shown), that is, a device that is not connected in the network domain 10, over the Internet, PSTN, or other external network. In that case, the message packet will be transferred by the router 16(n) of the sub-domain 11(n) that contains the to the firewall 12, either directly or through one or more other routers 16($n_1$), 16($n_2$) . . . in a manner similar to that described above. When the firewall 12 receives the message packet, it can determine whether the communication between the device 14(d) and the external device is authorized, and, if so, forward the message packet over the external network connection 17. Similarly, if an external device wishes to transmit a message packet to a device 14(d) connected in the network domain 10, the firewall 12 will receive the message packet from the external network connection 17. After the firewall 12 receives the message packet, it can determine whether the communication between the external device and the device 14(d) is authorized and, if so, forward the message packet to the router 16(n) of the sub-domain 11(n) which the device 14(d) is connected, either directly or indirectly through one or more other routers 16($n_1$), 16($n_2$) along a path from the firewall 12 to the router 16(n). After the router 16(n) has received the message packet, it can transmit the message packet over the sub-domain's communication link 15(n) to facilitate reception by the device 14(d). Communications between a device 14(d) and an external device may be over a "secure tunnel," in which at least some of the information in the message packets as transmitted over the external network connection 17 is in encrypted form, or alternatively the information may be in plaintext; if the communications is over a secure tunnel, the firewall 12 will encrypt information in the message packet as generated by the device 14(d) before transmitting the message packet over the external network connection 17, and decrypt the encrypted information in the message packet received over the external network connection 17 before forwarding it to the device 14(d).

The invention provides an arrangement that addresses a problem that can arise in connection with transfer of message packets that are transferred throughout the network domain, primarily by the routers 16(n). In particular, there can arise situations in which loops develop so that, instead of a message packet being transferred by the routers along a path from the router 16(n), through intermediate routers 16($n_1$), 16($n_2$) . . . to the router 16(n') of the sub-domain 11(n') that contains the destination device 14(d'), at some point along the path the message packet is diverted in such a way that it returns to a router 16($n_X$) along the path previous to the router 16($n_Y$) ($n_X$<$n_Y$) at which it was diverted. In that case, the message will continue being transferred in the loop through routers 16($n_X$), 16($n_{X+1}$), . . . , 16($n_Y$), . . . , 16($n_X$), . . . , 16($n_Y$) . . . This can occur if, for example, a communication link is connected incorrectly, a router is incorrectly programmed, or the like. In addition, it can occur in connection with a number of message packets. As more and more message packets get caught in the loop, the bandwidth through the routers associated with the loop taken up by those message packets increases, which can significantly degrade network performance.

To address this problem, typically each message packet is provided with a so-called "time to live" field, which is provided with a selected value when it is transmitted, and is decremented by each router that receives it. If a router decrements the value in the time to live field to zero, it will discard the message packet. While this does not eliminate the possibility of loops developing, it can attempt to limit the injury by ensuring that message packets will be discarded after they have gone around at least a portion of a loop a maximum number of times. Typically, message packets transmitted over wide area networks such as the Internet, which also have routers that forward message packets in a manner similar to that described above in connection with network domain 10, also include time to live fields to address the possibility of loops developing, and for such message packets the value in the time to live field is initialized to a relatively high number, typically thirty-two, to accommodate the possibility that it will not be decremented sufficiently that it will be discarded along the path from the source to the destination. Typically, that same initial value is also used as initial values in time to live fields of message packets that are to be transferred through LANs such as network domain 10. However, that value is generally much higher than would be necessary in a LAN such as network domain 10. In addition, it will be appreciated that, the higher the initial value, the longer a message packet that was in a loop would remain in the loop.

Accordingly, in accordance with the invention, devices 14(d), when they generate message packets, initialize the time to live fields to a relatively small value. The initial value is preferably selected to be high enough to ensure that the value is not decremented to zero over a relatively long path to the destination device within the network domain 10, and in one embodiment is selected to be on the order of five. Since the initial time to live value is lower than the initial value that is normally used, if the message packet gets caught in a loop, it will be discarded earlier than if the initial time to live value were the initial value that is normally used. Thus, if a loop develops, message packets get caught in the loop will be discarded earlier than normally, which can reduce the amount of bandwidth that is taken up by such messages.

A device 14(d) will also use this reduced initial time to live value in connection with message packets that are to be transmitted to external devices. In that case, when the firewall 12 proceeds to forward the message packet over the external network connection 17, it will increase the value in the time to live field to correspond to the initial value that is used in message packets transmitted over the Internet, that is, thirty-two, as described above. Similarly, when the firewall 12 receives a message packet from the external network connection 17, if it determines that the message packet is to be forwarded to a device 14(d), it will substitute the initial time to live value that is selected for use in the network domain 10 in the time to live field. This substitution will generally result in a reduction in the time to live value from that in the message packet as received over the external network connection 17, so that, if a loop develops in the network domain 10, message packets get caught in the loop will be discarded earlier than normally, which can reduce the amount of bandwidth that is taken up by such messages in the network domain 10.

Figure 2:
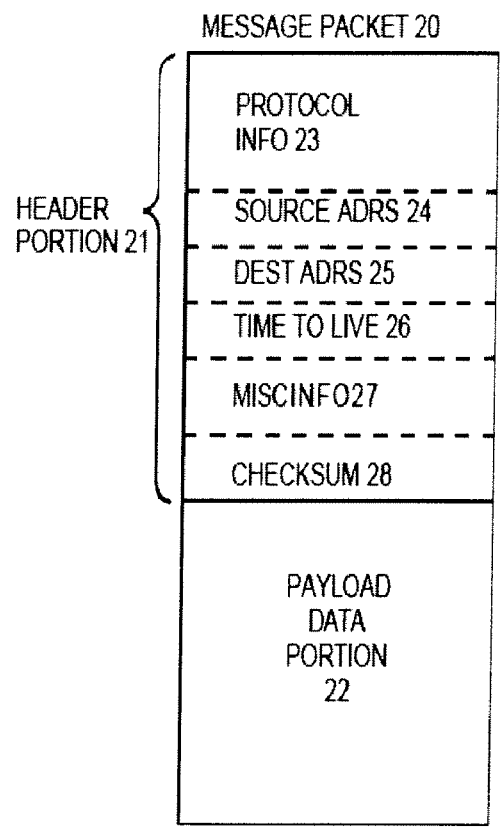
FIG. 2 depicts the structure of an illustrative message packet used in connection with the network domain depicted in FIG. 1.

Before proceeding further, it would be helpful to describe the structure of a message packet used in connection with one embodiment of the invention. FIG. 2 depicts an illustrative message packet 20 including a header portion 21 and a payload data portion 22. Generally, the message packet 20 that will be described in connection with FIG. 2 will conform to the format defined for the Internet protocol, but it will be appreciated that any other convenient format may be used. In a message packet 20 that conforms to the format defined for the Internet protocol, the header portion 21 contains information that is used by the routers 16(n) and firewall 12 in connection with transmission of message packets throughout the network domain 10. In addition, for message packets that a router 16(n) transmits onto its sub-domain's communication link 15(n), the header portion 21 contains information that each device 14(d) uses to determine whether it is to receive the respective message packet. Similarly, for message packets that the firewall 12 transmits over or receives from the external network connection 17, the header portion 21 contains information that is used in connection with transfer of message packets through the external network. The payload data portion 22 of message packet 20 contains the information that the source device is to transfer to the destination device. As noted above, if message packets are to be transferred over the external network over a secure tunnel, some portion of the message packets may be encrypted, and it should be noted that the payload data portion 22 is the portion that is to be encrypted; in that case, the information in the header portion 21 will not be encrypted since routers, switches and the like which forward the message packets in the external network will need to have access to the information to route the message packets to the respective destinations.

The header portion 21 includes a plurality of fields, including one or more fields, generally referred to by reference numeral 23, which contain protocol information, a source address field 24, a destination address field 25, a time to live field 26, one or more fields, generally referred to by reference numeral 27, which contain miscellaneous information, and a checksum field 28. The protocol information in field(s) 23 may include such information as a protocol version identifier, a quality of service identifier, and a length field. The quality of service identifier can identify a priority for the message packet. The length field identifies the total length of the message packet. If the message packet 20 is one of a plurality of message packets that together are fragments of a larger message packet, the protocol information may also include a fragment offset value identifying the offset of the message packet 20 into the larger message packet; this will allow the destination device to reassemble the larger message packet from the fragments. Other types of protocol information will be apparent to those skilled in the art.

The source and destination address fields 24 and 25 identify the source device, the device that generated the message packet 20, and the destination device, the device that is to receive the message packet 20, respectively.

The time to live field 26 receives the time to live value as described above. As noted above, the source device 14(d) in network domain 10 will provide an initial time to live value, and each router 16(n) that receives the message packet 20 will decrement the value in the time to live field 26. Since a router 16(n) will discard the message packet 20 if the value in the time to live field decrements to zero, the initial value provided by the source device 14(d) will preferably selected to be high enough to ensure that the value is not decremented to zero over a relatively long path to the destination device within the network domain 10.

The miscellaneous information field(s) 27 can identify various options for the message packet. A number of options are defined for the Internet protocol. A security option may be selected if information in the message packet is deemed sensitive, which may affect the path over which the message packet is routed particularly through the external network. A source routing option may be selected whereby the source device, or a router along the path to the destination device, specifies the path therefrom to the destination device; in that case, the path is included in the miscellaneous information field(s) 27. In addition, typically the length of the header portion 21 is required to be on octet boundaries, with each octet comprising a predetermined number of bits, the miscellaneous information field(s) may include padding to ensure that the header portion 21 ends on an octet boundary. The checksum field 28 includes a value corresponding to the checksum of the values in the other fields 23 through 27. The checksum value can be used to verify that the information in the fields 23 through 27 was correctly received. If the checksum indicates that the information in fields 23 through 27 was not correctly received, the error may result in the message packet being routed to a device that is not the intended destination, in which case the message packet can be discarded.

Figure 3:
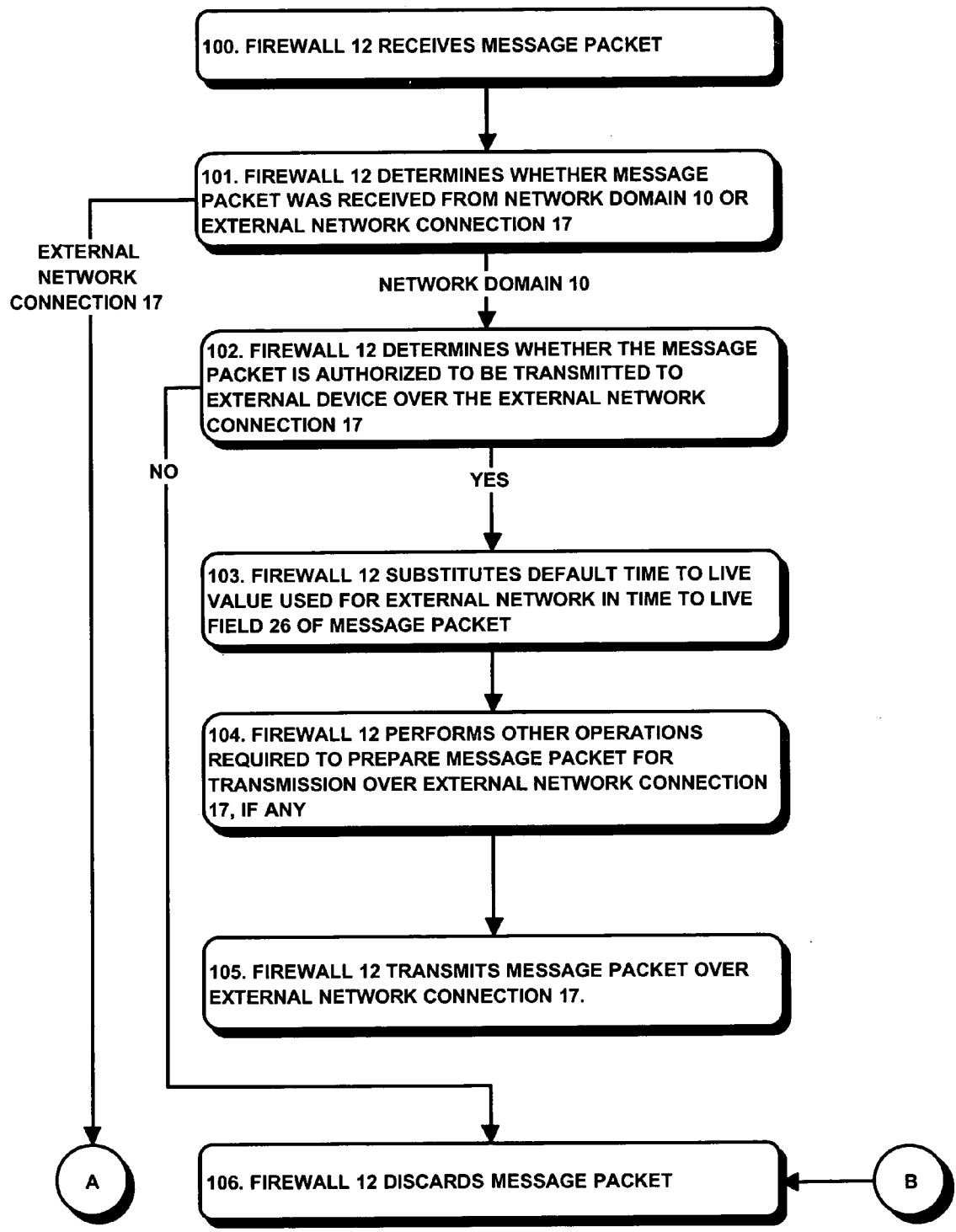
FIG. 3 is a flow chart depicting operations performed by a firewall used in the network domain depicted in FIG. 1 in connection with the invention.
Figure 3A:
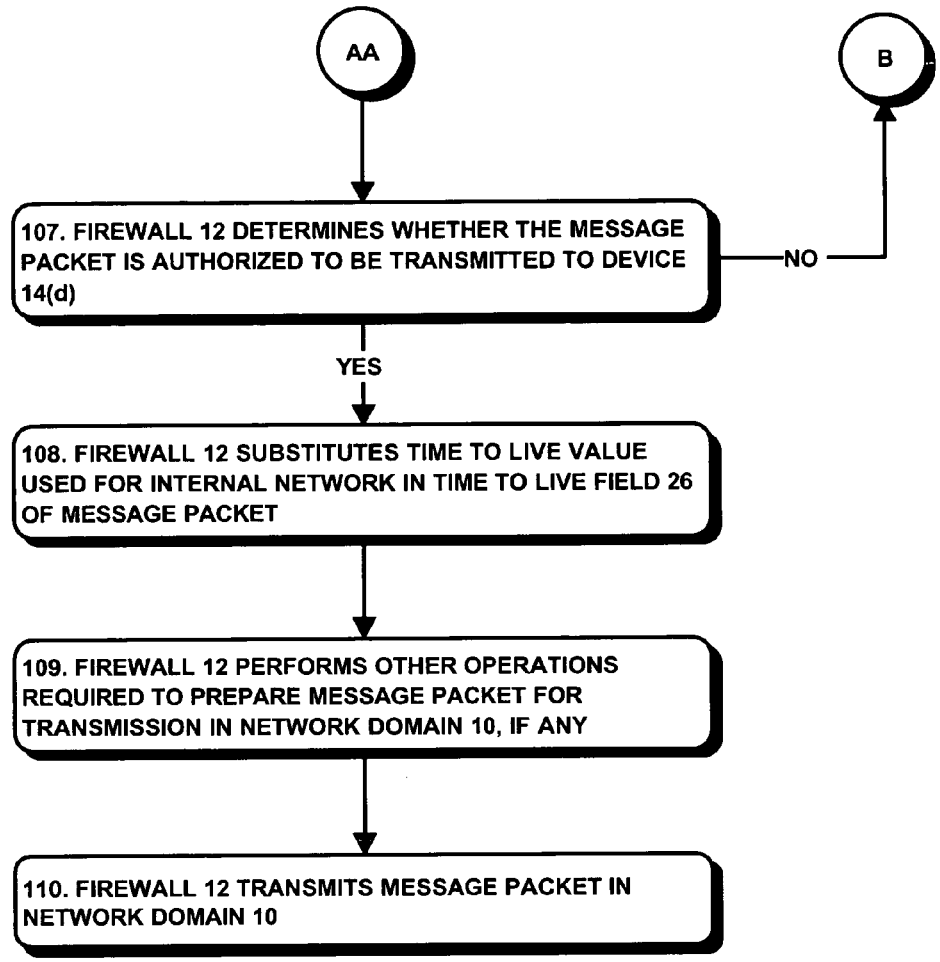

With this background, and as noted above, the firewall 12, when it receives a message packet from a router 16(n) inside the network domain 10, will substitute the normal time to live value in the time to live field 26 before it transmits the message packet over the external network connection 17. This will generally provide that the message packet will not be discarded before it reaches the destination device unless the message packet loops. Contrariwise, the firewall 12, when it receives a message packet from the external network connection 17, substitutes the initial time to live value selected for the network domain 10 in the time to live field 26 before it transmits the message packet into the network domain 10, which, as noted above, can serve to reduce the bandwidth taken up by message packets in a loop if a loop develops in the network domain 10. Operations performed by the firewall 12 in this connection are described in the flow chart depicted in FIG. 3. Since the operations will be readily apparent to those skilled in the art from the above description, they will not be described further herein.

The invention provides a number of advantages. In particular, the invention provides an arrangement that facilitates use of a time to live values within the network domain 10 that can reduce the bandwidth taken up by message packets that are in a loop in the network domain 10, which can allow for increased bandwidth available for message packets that are being transferred through a portion of the loop but which are not themselves looping through the entire loop.

It will be appreciated that a number of modifications may be made to the arrangement described above in connection with FIGS. 1 through 3. For example, the devices 14(d) can be any kind of devices which may be connected in a network domain 10, including any type of computers (illustratively, personal computers, workstations, mini- and mainframes), as well as devices, such as mass storage systems, network printers, and other devices that can store, process and otherwise make use of digital information. Although the network domain 10 has been described as making use of routers to transfer message packets between and among sub-domains 11(n), it will be appreciated that any type of device that can switch message packets among a plurality of inputs and outputs may be used, including, for example, switching nodes, bridges, gateways, and the like. Furthermore, although the network domain has been described as making use of message packets that conform to the format specified in the Internet protocol, it will be appreciated that message packets of any format can be used, provided they contain a field that performs a function similar to that provided by the time to live field. For example, a message packet that conforms to the format defined by the CLNP (ConnectionLess Network Protocol) protocol includes a "lifetime" field that performs a function similar to that provided by the time to live field 26. In addition, message packets can be transferred over communication links 13(p) and 15(n) using any convenient transfer protocol or protocols. Illustratively, message packets may be transferred over the intra-sub-domain communication link 15(n) using, for example, the well-known Ethernet protocol, a token ring protocol, or any other convenient protocol.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A firewall for transferring message packets from an external network to a local area network, at least one of the message packets including a time to live field including a time to live value, the firewall comprising:
  A. a message receiver configured to receive the at least one of the message packets from the external network;
  B. a message processor configured to process the at least one message packet to provide, in the time to live field, a time to live value selected to be related to a maximum path length for message packets transferred over the local area network; and
  C. a message transmitter configured to transmit the at least one message packet as processed by the message processor over the local area network.

2. A firewall as defined in claim 1 in which the firewall selectively transfers message packets from the external network to the local area network.

3. A firewall as defined in claim 2 in which the selection is made for a respective message packet based on whether a source for the respective message packet in the external network is authorized to transmit a message packet to a destination in the local area network.

4. A firewaall as defined in claim 1, the firewall further transferring message packets from the local area network to the external network, at least one of the message packets including a time to live field including a time to live value,
  A. the message receiver being further configured to receive the at least one of the message packets from the local area network;
  B. the message processor being further configured to process the at least one of the message packets received from the local area network to provide, in the time to live field, a predetermined arbitrary value; and
  C. the message transmitter being further configured to transmit the at least one of the message packets as processed by the message processor over the external network.

5. A firewall as defined in claim 4 in which the firewall selectively transfers message packets from the local area network to the external network.

6. A firewall as defined in claim 5 in which the selection is made for a respective message packet based on whether a source for the respective message packet in the local area network is authorized to transmit a message packet to a destination in the external network.

7. A device for generating and transmitting at least one message packet over network, the at least one message packet including a time to live field including a time to live value, the device comprising:
  A. a message generator configured to generate the at least one message packet and provide, in the time to live field, a time to live value selected to be related to a maximum path length for message packets transferred over the network; and
  B. a message transmitter configured to transmit the at least one message packet as generated by the message generator over the network.

8. A method of transferring message packets from an external network to a local area network, at least one of the message packets including a time to live field including a time to live value, the method comprising the steps of:
  A. receiving the at least one of the message packets from the external network;
  B. processing the at least one message packet to provide, in the time to live field, a time to live value selected to be related to a maximum path length for message packets transferred over the local area network; and
  C. transmitting the at least one message packet as processed over the local area network.

9. A method as defined in claim 8 in which message packets are transferred from the external network to the local area network.

10. A method as defined in claim 9 in which the selection is made for a respective message packet based on whether a source for the respective message packet in the external network is authorized to transmit a message packet to a destination in the local area network.

11. A method as defined in claim 8 of further transferring message packets from the local area network to the external network, at least one of the message packets including a time to live field including a time to live value, the method further including the steps of
   A. receiving the at least one of the message packets from the local area network;
   B. processing the at least one of the message packets received from the local area network to provide, in the time to live field, a predetermined arbitrary value; and
   C. transmittng the at least one of the message packets as processed over the external network.

12. A method as defined in claim 11 in which message packets are transferred from the local area network to the external network.

13. A method as defined in claim 12 in which the selection is made for a respective message packet based on whether a source for the respective message packet in the local area network is authorized to transmit a message packet to a destination in the external network.

14. A method of generating and transmitting at least one message packet over network, the at least one message packet including a time to live field including a time to live value, the device comprising:
   A. generating the at least one message packet and provide, in the time to live field, a time to live value selected to be related to a maximum path length for message packets transferred over the network; and
   B. transmitting the at least one message packet as generated by the message generator over the network.

15. A computer program product for use in connection with a computer to provide a firewall for transferring message packets from an external network to a local area network, at least one of the message packets including a time to live field including a time to live value, the computer program product comprising a Non-transitory computer-readable medium having encoded thereon a message processor module configured to enable the computer process the at least one message packet to provide, in the time to live field, a time to live value selected to be related to a maximum path length for message packets transferred over the local area network.

16. A computer program product as defined in claim 15, the firewall further transferring message packets from the local area network to the external network, at least one of the message packets including a time to live field including a time to live value, the message processor module being further configured to process the at least one of the message packets received from the local area network to provide, in the time to live field, a predetermined arbitrary value.

17. A computer program product for use in connection with a computer to provide a device for generating and transmitting at least one message packet over network, the at least one message packet including a time to live field including a time to live value, the computer program product comprising a Non-transitory computer-readable medium having encoded thereon a message generator configured to generate the at least one message packet and provide, in the time to live field, a time to live value selected to be related to a maximum path length for message packets transferred over the network.

* * * * *